United States Patent
Boner et al.

(10) Patent No.: US 7,143,781 B2
(45) Date of Patent: Dec. 5, 2006

(54) FLEXIBLE BLADDER APPARATUS FOR FLUID FLOW CONTROL

(75) Inventors: Mark C. Boner, Roswell, GA (US); Paula K. Gurney, Atlanta, GA (US)

(73) Assignee: Wwetco, LLC, Atlanta, GA (US)

( * ) Notice: Subject to any disclaimer, the term of this patent is extended or adjusted under 35 U.S.C. 154(b) by 371 days.

(21) Appl. No.: 10/767,873

(22) Filed: Jan. 29, 2004

(65) Prior Publication Data

US 2004/0226612 A1    Nov. 18, 2004

Related U.S. Application Data

(60) Provisional application No. 60/443,323, filed on Jan. 29, 2003.

(51) Int. Cl.
*G05D 9/02* (2006.01)

(52) U.S. Cl. ............... 137/453; 137/454; 137/81.1; 251/61.1

(58) Field of Classification Search ............... 137/453, 137/454, 409, 451, 78.5, 81.1, 81.2; 251/61.2, 251/61.1, 6
See application file for complete search history.

(56) References Cited

U.S. PATENT DOCUMENTS

| | | | | |
|---|---|---|---|---|
| 4,182,371 A | * | 1/1980 | Moore | 251/61.1 |
| 4,321,939 A | * | 3/1982 | Fenwick | 137/101.27 |
| 4,494,345 A | | 1/1985 | Peterson | |
| 6,053,191 A | | 4/2000 | Hussey | |
| 6,616,120 B1 | | 9/2003 | Barzuza et al. | |

* cited by examiner

*Primary Examiner*—Kevin Lee
(74) *Attorney, Agent, or Firm*—Smith, Gambrell & Russell, LLP

(57) ABSTRACT

The present invention provides an apparatus and method for controlling the flow of fluids through a conveyance with a hydraulic valve including a flexible portion. The flexible portion is positioned in the conveyance so that fluid enters the membrane from an upper containment space and the expansion of the flexible portion causes the valve to restrict or block the flow of fluid being controlled through the conveyance.

23 Claims, 2 Drawing Sheets

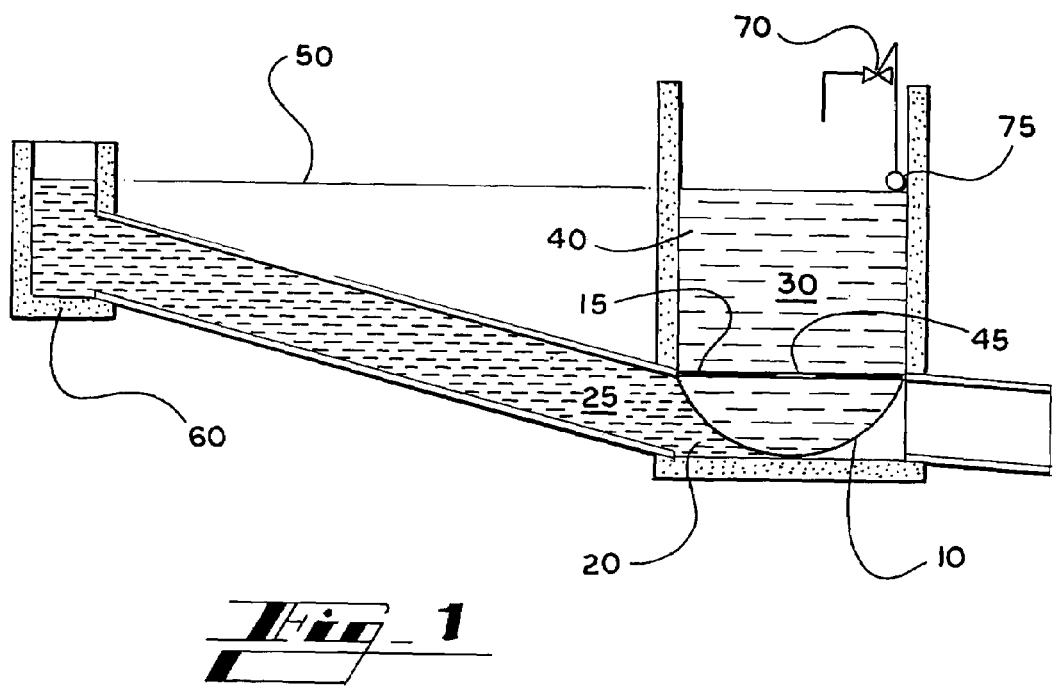
Fig_1
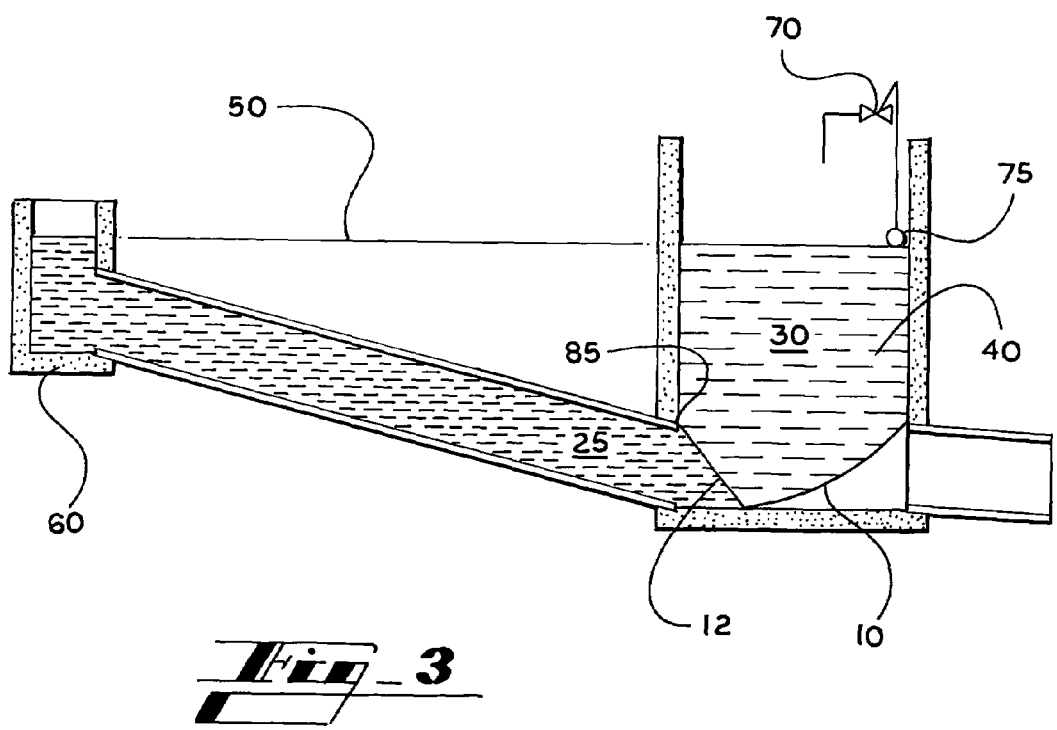
Fig_3

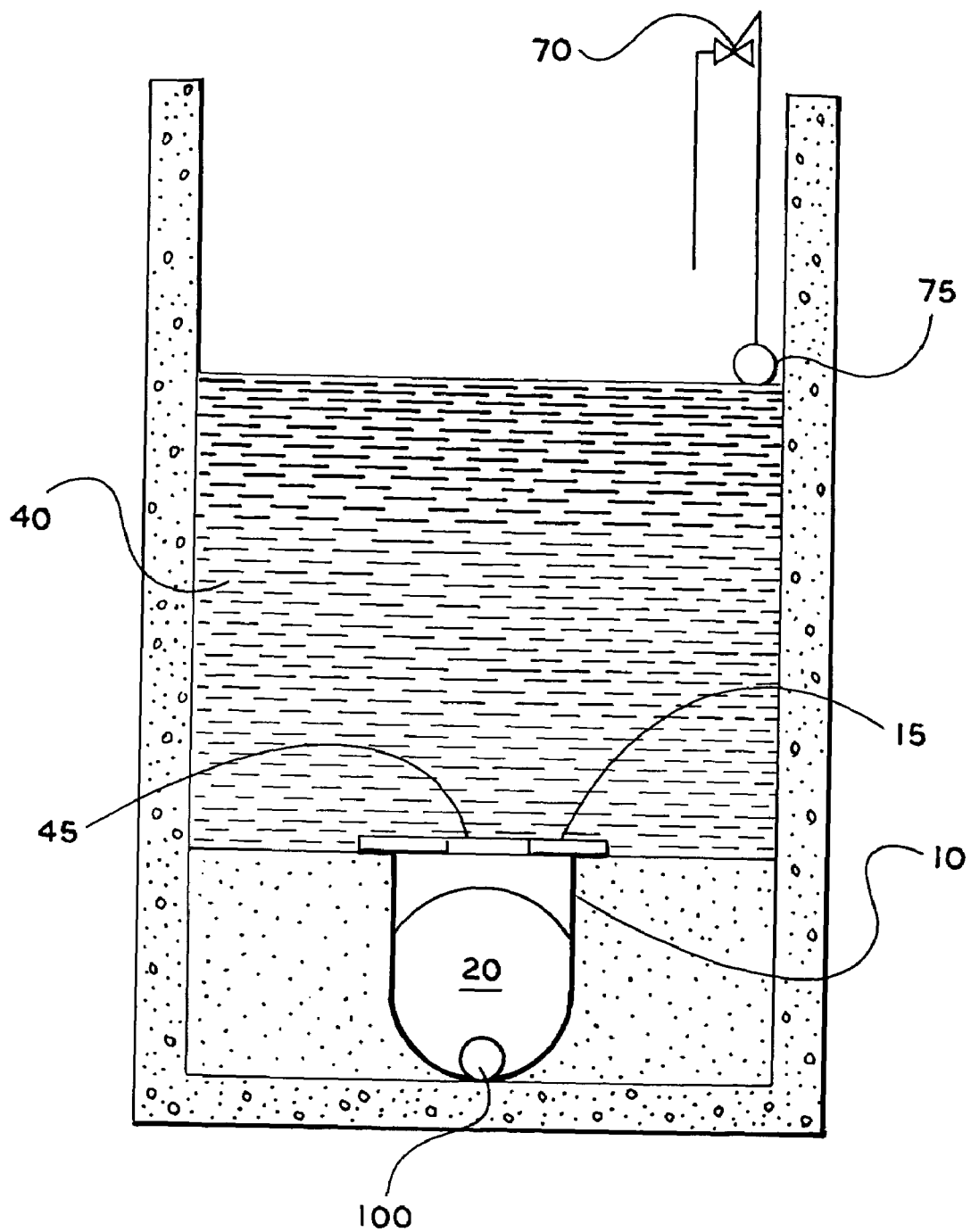
Fig_2

FLEXIBLE BLADDER APPARATUS FOR FLUID FLOW CONTROL

CROSS-REFERENCE TO RELATED APPLICATIONS

This application claims the benefit of priority of U.S. application Ser. No. 60/443,323 filed Jan. 29, 2003, which is incorporated herein by reference.

BACKGROUND OF THE INVENTION

The present invention relates to control of the flow of fluids with a hydraulic valve including a flexible portion, such as including a membrane or bladder, through a conduit such as a pipe, culvert, channel, drainage, stream or similar closed or open fluid carrying system.

Prior art fluid flow control devices have typically relied on motor or air-driven valves, slide gate mechanisms or inflatable dams. All of these techniques require external power and/or moving parts subject to problems such as ice formation, dirt and sediment accumulation and/or power failures.

Accordingly, there is a need for a fluid flow control device and method with powerless automation, increased reliability and fewer mechanical parts.

SUMMARY OF THE INVENTION

The present invention answers these needs by a providing an apparatus and method for controlling the flow of fluids with a hydraulic valve that includes an upper opening and inner containment area so a flexible portion of the valve, such as membrane or bladder, expands the valve by "top to down" hydraulic operation into a pipe, culvert, channel or similar conveyance to restrict fluid flow.

In an embodiment of the invention a float-operated mechanical valve or other device in a containment space above the opening to the hydraulic valve may be provided for adding fluid into the flexible portion of the valve causing the "top to down" hydraulic operation.

In another embodiment of the invention an overflow pipe in the containment space above the opening to the valve may be provided for maintaining a fixed level of fluid.

In another embodiment of the present invention, an upper plate including one or more orifices may be attached to a bladder for controlling fluid flow into the hydraulic valve. The size and number of orifices may be adjusted to control the rate of expansion and deflation.

In other embodiments of the invention, the flexible bottom of the valve may be shaped to permit a minimum full-time flow through, such as a desired fixed drainage or base flow. In an alternative embodiment or complimentary embodiment, a rigid flow-through element is provided to create a full-time flow through channel between the flexible portion of the valve and conveyance. The rigid flow-through element may be a simple orifice acting to restrict flow having hydraulic characteristics of increasing flow with increasing upstream head. The rigid flow-through element may be a vortex device with hydraulic characteristics of a relative fixed flow for increasing upstream head. The rigid flow-through element may be provided in two sections: the top section attached to the bottom of the valve and the bottom section attached to or being apart of the invert of the pipe, culvert, channel or similar conveyance.

In another embodiment of the invention, the flexible portion of the valve is permitted to open and rise into the inner containment such that the pipe, culvert, channel or similar conveyance has unrestricted full-flow capacity of the original pipe, culvert, channel or similar conveyance system.

It is therefore an object of the present invention to reduce or eliminate the need for an external power source or moving parts to open or restrict the flow of fluid through a pipe, culvert, channel, drainage, stream or similar conveyance.

It is a further object of the invention to provide a simple fluid flow control valve, such as including a bladder in certain embodiments, in which the hydrostatic pressure, and thereby the rate of opening and closing of the conveyance, can be adapted to the particular purpose or capacity of the fluid conveyance or treatment system.

It is a further object of the invention to provide a simple fluid control that can optimize the storage capacity of a conveyance system, for example to capture stormwater, for each and every runoff event thus attenuating downstream flow rates and minimizing system overflows or embankment erosion.

It is a further object of the invention to provide a simple fluid flow control to maximize flow diversion to a secondary flow system such as a treatment system or individual treatment process without exceeding the hydraulic capacity of the secondary flow system.

It is a further object of the invention to provide a simple fluid control adaptable to existing structures or fluid conveyance systems without restricting peak capacities of the existing fluid conveyance systems.

It is a further object of the invention to provide a simple fluid flow control that can maintain a base flow-through and allow passage of aquatic life, where. appropriate, in a fluid conveyance system.

It is a further object of the invention to provide a simple fluid control that provides periodic self-cleaning of grit, debris and other deposits from the invert of the conveyance system.

BRIEF DESCRIPTION OF THE DRAWINGS

FIG. 1 is a schematic cross-sectional view of a fluid flow control apparatus controlling fluid conveyed from a catch basin in an embodiment of the present invention.

FIG. 2 is a schematic cross-sectional view of a fluid control apparatus including a flow-through opening in an embodiment of the present invention.

FIG. 3 is a schematic cross-sectional view of a fluid flow control apparatus including a flexible portion and hinge mechanism in another embodiment of the present invention.

DETAILED DESCRIPTION OF THE INVENTION

The present invention provides an apparatus and method for controlling fluid with "top to down" hydraulic operation of a flexible portion of a valve secured in a conveyance, including pipes, channels, culverts, and the like. The flexible portion may include a bladder with one or more openings at the top of the bladder. It will also be appreciated that a plurality of valves may also be used in a large conveyance.

Referring to FIGS. 1–2, containment space 40 is provided above the bladder portion 10 of a valve for permanently containing or adding fluid and maintaining a fixed volume of fluid in and above the bladder 10. The bladder 10 expands and contracts based on the hydrostatic pressures of fluid within the bladder and in the upstream conveyance favoring expansion to fill and block the conveyance and the fluid flowing through the conveyance until the upstream conveyance hydrostatic pressure exceeds the hydrostatic pressure within the bladder. When the upstream conveyance hydrostatic pressure exceeds hydrostatic pressure in the bladder 10, the bladder 10 opens to relieve the upstream conveyance hydrostatic pressure until and only when it is equal to the hydrostatic pressure in the bladder 10, thereby maintaining a maximum fixed hydraulic level in the upstream conveyance.

In one embodiment of the invention, a fluid control bladder 10 is used for maintaining a flow-through dry weather base flow in a fluid conveyance system and then utilize the upstream conveyance storage capacity during wet weather conditions, such as a combined sewer system or a sanitary sewer system having wet weather flow contributions. In such systems dry weather base flows are allowed to pass under the fluid control bladder 10 up to a specified design flow peaking factor. During wet weather flow conditions, the fluid control bladder restricts the flow-through causing maximum upstream storage utilization resulting in retention and capture of wet weather flow for subsequent treatment instead of discharging from the system into receiving waters.

In another embodiment, the fluid control bladder 10 is used to divert flow to secondary flow streams, such as to a treatment system. In this embodiment the fluid control bladder 10 maximizes use of available upstream storage volume and thus maximizes flow to the treatment system. In a further embodiment, the fluid control bladder 10 can provide split-stream flow control by diverting flows around each level of treatment only after the capacity of the treatment process is exceeded and only in an amount after available storage is utilized and for only the excess flow above the treatment process design flow rate. It can be appreciated that in such systems, split-stream flow control using the fluid control bladder 10 can maximize storage and treatment of highly variable stormwater hydrographs providing the highest treatment level available.

In another embodiment, the fluid control bladder 10 can be used in tributary streams or drainage ways to allow passage of base flows and aquatic biology during dry weather or slightly elevated flow conditions, while restricting higher flow rates during wet weather conditions thus attenuating downstream flow velocities by using the upstream storage capacity in the stream floodways or drainage structures. In such systems in-line flow attenuation of each and every stormwater event will reduce downstream embankment erosion. It may be appreciated that this application may also allow for upstream groundwater augmentation, where appropriate.

In another embodiment, such as a flood control structure, stormwater storage basins or lake, the fluid control bladder 10 can be used to store fluid up to the maximum storage volume of the structure defined by a maximum upstream level and allow passage of only the excess flow maintaining the maximum water level yet allow excess flow up to and including the maximum capacity flow passage during peak flow conditions.

Accordingly, the present invention is particularly adapted for directing and controlling the flow of stormwater and wastewater. However, it will be appreciated that the invention may be adapted for controlling the flow, storage and diversion of fluid through a variety of conveyances. Those skilled in the art will appreciate that the present invention is adapted for use with a variety of fluids.

Referring to FIG. 1, a flexible and expandable bladder 10 is provided across a conveyance 20 such as a pipe or channel. The conveyance 20 may be either an open conveyance such as a channel or closed conveyance such as a pipe.

In exemplary embodiments the bladder 10 comprises single or multi-ply membranes of chlorosulfonated polyethylene (Hypalon), polyvinyl chloride (PVC), rubber, polypropylene, polyethylene, vinyl, neoprene, polyurethane and woven and non-woven fabrics.

The bladder 10 is positioned in the conveyance 20 being controlled so that the expanded bladder 10 completely blocks or highly restricts the flow of fluid 25 through the channel 20. It will further be appreciated that the bladder 10 is preferably leak-resistant and secured above the conveyance 20 being controlled so that fluid 30 used to expand the bladder does not move into conveyance 20. Similarly, fluid 25 in the conveyance 20 is prevented from entering into or above the bladder 10.

Referring to FIG. 3, in still other embodiments the flexible portion 10 of the valve may be combined with additional components, such as a hinge mechanism 85 and a plate 12 to similarly restrict the flow of fluid through the channel 20. In this embodiment, the pressure from fluid 30 expands the flexible portion 10 of the valve downward to also actuate plate 12 downward to restrict or block the flow of fluid 25 through conveyance 20.

In embodiments of the invention, the flexible portion 10 of the valve may be opened at the top, or directly exposed to fluid 30, to permit fluid to directly enter the flexible portion 10 and expand into the conveyance 20. Referring to FIGS. 1 and 2, in another embodiment of the invention, the bladder 10 includes an upper plate 15 for securing the bladder 10 above the channel 20. In a further embodiment, the upper plate 15 secures to the bottom of a make-up fluid containment space 40. Upper plate 15 includes one or more orifices 45 to allow fluid 30 from the containment space 40 to pass into and expand the bladder 10. The number and size of orifices 45 may be adjusted so that the desired rate of expansion and deflation, and thereby desired flow-through, is achieved.

In exemplary embodiments the containment space 40 includes pipe and concrete manhole, concrete structures, fiber reinforced polymer (FRP) structures, and metal structures.

In embodiments of the invention where normal operation dictates the conveyance 20 be closed to flow through, fluid, such as water, is provided in the make-up fluid containment space 40. The fluid 30 enters the bladder 10 to restrict or completely block the flow of fluid 25 through the conveyance 20.

When the bladder 10 is unexpanded, the bladder 10 deflates as a result of higher upstream hydrostatic pressure and rises up into the containment space 40 to minimize obstruction to the fluid 25 flow through the conveyance 20.

In an embodiment of the invention, the depth of the fluid 30 maintained in the make-up containment space 40 is adjusted with respect to the maximum allowed elevation 50 of upstream fluid, such as in a catch basin or manhole 60 or other structure to prevent upstream flooding. In an embodiment where maximization of the use of the volume of the upstream open or closed channel or piping system is desired, the depth of the fluid 30 in the containment space 40 is approximately equal to the elevation depth 50 of the upstream fluid. The maximum upstream storage volume determined by the upstream level 50 may be adjusted by setting the depth of the fluid 30 in the containment space 40. Increasing upstream flow causing increased upstream volume and a rise above the desired upstream level 50 will result in a greater upstream hydrostatic pressure in conveyance 20 than in containment space 40 causing the bladder 10 to be pushed upward releasing the fluid 25 in the conveyance 20 in an amount until level 50 is approximately equal to the depth of the fluid 30 in the containment space 40. Accordingly, it will be appreciated that the depth of the fluid 30 in the containment space 40 can be adjusted proportional to the desired maximum elevation 50 of the upstream fluid with only excess flow volume passing under the bladder 10 and through the conveyance 20. The flow rate of the excess volume passing under the bladder 10 will be approximately equal to the flow into the upstream conveyance system when and after the maximum volume is reached.

In one embodiment of the invention, a float-operated mechanical make-up valve 70 is provided to automatically maintain a desired fluid level in the containment space. For example, leakage and evaporation can produce water loss. Upon a drop in height, the float 75 self-activates the valve 70 to provide fluid to the containment space until the preset level is restored. In embodiments of the invention, the float-operated valve 70 does not require external power. It can also be appreciated that make-up water can be provided in other ways such as electronic level measurements and other actuated valve controls or pumps for supplying make-up water.

In another embodiment of the invention, an overflow pipe may be provided within the containment space 40 to fix the desired depth of fluid 30. For example, extraneous flow leakage into the containment space 40 can result in higher than desired depth of fluid 30 and thus can be expelled through the overflow pipe to maintain the desired depth of fluid 30 and thus maximum upstream level 50. It can be appreciated that make-up water supplied in excess amounts, for example, from a leaking float valve or a continuous running pump supply will be expelled through the overflow pipe without increasing the desired depth of fluid 30. It will also be appreciated that the overflow pipe may connect to conveyance 20 on the exiting side of the valve, or could be a pipe or channel directing the overflow to another location.

Referring to FIG. 2, a rigid spacing element 100 is provided in an embodiment of the invention to create a full-time drainage or base flow opening between the bladder 10 and the conveyance 20. In this embodiment, the spacing element 100 prevents the bladder 10 from completely blocking the conveyance 20, and permits a limited amount of fluid 25 passing under the bladder 10 to flow through the conveyance 20. The bladder 10 otherwise functions as described.

The flow-through rate through the spacing element 100 will change with increasing upstream elevation from zero to the maximum desired elevation 50 (FIG. 1). In some applications there is always a base flow that must pass through the conveyance 20 and under the bladder 10. The base flow would typically have a free surface flow as it passes through the spacing element 100. It can be appreciated that the spacing element 100 would be sized to accommodate the base flow requirements possibly including peaking factors for diurnal and/or seasonal changes as needed. The spacing element 100 can be designed to act as a simple orifice or as a vortexing orifice. In the case of the spacing element 100 provided as a simple orifice, increasing upstream level 50 will result in increasing pass-through flow rates. In the case of a vortexing orifice, pass through flow rates can be limited to an approximate maximum value for increasing upstream levels 50. It can be appreciated that in some applications, limited base flows requiring a spacing element to be a vortexing orifice would be desirable.

In another embodiment for providing a full-time drainage or base flow, a bladder with a pre-shaped orifice, such as rubber bladder with an arched portion along the bottom of the bladder 10, is secured in the conveyance. Opposite ends of the arc portion are sufficiently spaced so that when fluid 30 enters the bladder 10, the bladder 10 expands to block the conveyance 20, except that the orifice created by the arched-in portion of the bladder remains. As with the use of a rigid element 100, a full-time fluid flow-through is created.

In other embodiments for providing full-time drainage or base flow the spacing element 100 can be provided in the bottom of the conveyance 20 or in both the bottom of the conveyance 20 and at the bottom of the bladder 10. It can be appreciated that having arched spacing elements 100 in either the bladder 10, or the conveyance bottom 20 or both, will result in better automatic flushing of potential accumulated debris and grit when the bladder 10 contracts due to rising upstream level 50 above the depth of fluid 30 passing excess flow under the bladder 10.

Accordingly, while the invention has been described with reference to the structures and processes disclosed, it is not confined to the details set forth, but is intended to cover such modifications or changes as may fall within the scope of the following claims.

What is claimed is:

1. A fluid control apparatus comprising:
  a) a fluid conveyance; and
  b) a valve positioned in the conveyance, wherein the valve includes a flexible portion secured to receive fluid from an upper containment including a preset fluid level to cause the valve to restrict the flow of fluid through the conveyance, wherein the preset fluid level is determined from the liquid height of a fluid storage point upstream from the valve in the conveyance, wherein said storage point provides fluid to the conveyance, and wherein the valve includes at least one upper opening to receive fluid from the containment above the flexible portion.

2. The apparatus of claim 1 wherein the flexible portion is a bladder and the valve includes one or more orifices in an upper plate secured to the top of the bladder.

3. The apparatus of claim 2 further comprising a float-operated valve that automatically maintains a preset fluid level in the containment.

4. The apparatus of claim 1 further comprising a float-operated valve that automatically maintains a preset fluid level in the containment.

5. The apparatus of claim 4 wherein the preset fluid level is determined from the liquid height of a fluid storage point upstream from the valve in the conveyance and wherein said storage point provides fluid to the conveyance.

6. The apparatus of claim 5 further comprising a fixed orifice between the flexible portion and the conveyance, wherein the orifice permits a constant volume of water to flow through the conveyance when the valve is expanded.

7. The apparatus of claim 2 further comprising a fixed orifice between the bladder and the conveyance, wherein the orifice permits a constant volume of fluid to flow through the conveyance when the valve is expanded.

8. The apparatus of claim 7 wherein the fixed orifice is a vortexing orifice.

9. The apparatus of claim 1 wherein the valve includes material selected from the group consisting of chlorosulfonated polyethylene, polyvinyl chloride, rubber, polypropylene, polyethylene, vinyl, neoprene, polyurethane and woven and non-woven fabrics.

10. The apparatus of claim 1 further comprising a fixed orifice between the valve and the conveyance, wherein the orifice permits a constant volume of water to flow through the conveyance when the valve is expanded.

11. A fluid control apparatus comprising a flexible membrane positioned in a fluid conveyance:
   a) wherein flow of fluid outside the membrane and through the conveyance is controlled by top to down hydrostatic pressure of a fluid within the membrane; and
   b) wherein the fluid within the membrane is provided from an upper containment into an opening at the top of the membrane.

12. The apparatus of claim 11 wherein the fluid conveyance is a water conveyance.

13. The apparatus of claim 11 wherein the opening includes one or more orifices into the membrane.

14. The apparatus of claim 13 further comprising an upper plate attached to the top of the membrane and wherein the one or more orifices are located in the plate.

15. The apparatus of claim 14 wherein the containment is a concrete or pipe containment.

16. The apparatus of claim 11 further comprising:
   a) a fluid containment above the membrane for providing the fluid within the membrane; and
   b) a float-operated valve within the containment for automatically maintaining fluid within the containment at a preset depth.

17. The apparatus of claim 13 further comprising:
   a) a fluid containment above the membrane for providing the fluid within the membrane; and
   b) a float-operated valve within the containment for automatically maintaining fluid within the containment at a preset depth.

18. The apparatus of claim 17 further comprising a fixed orifice between the membrane and the conveyance that provides a constant drain of a volume of fluid through the conveyance.

19. The apparatus of claim 11 further comprising a fixed orifice between the membrane and the conveyance that provides a constant drain of a volume of fluid through the conveyance.

20. The apparatus of claim 11 wherein the upper containment includes an overflow for fluid provided to the membrane to exit the containment at the fluid level of the overflow.

21. The apparatus of claim 11 further comprising a valve with a flexible portion, wherein the valve is positioned in a fluid conveyance so that the flow of fluid through the conveyance is controlled by the top to down hydrostatic pressure of a fluid against the flexible portion of the valve.

22. The fluid apparatus of claim 21 wherein the flexible portion of the valve is positioned for expansion in the conveyance to control the flow of fluid with the flexible portion of the valve.

23. The fluid apparatus of claim 21 wherein the valve includes a rigid portion connected to the flexible portion for actuation by expansion of the flexible portion so that the rigid portion controls the flow of fluid through the conveyance.

* * * * *